United States Patent
Nishiguma et al.

[11] Patent Number: 5,291,006
[45] Date of Patent: Mar. 1, 1994

[54] AUTHENTICITY IDENTIFYING SYSTEM FOR INFORMATION STORAGE CARDS

[75] Inventors: Hiroaki Nishiguma; Hidekazu Hosino; Yoshiaki Seki, all of Kanagawa, Japan

[73] Assignee: NHK Spring Co., Ltd., Yokohama, Japan

[21] Appl. No.: 788,569

[22] Filed: Nov. 6, 1991

[30] Foreign Application Priority Data

| Aug. 11, 1989 | [JP] | Japan | 1-209065 |
| Aug. 11, 1989 | [JP] | Japan | 1-209066 |
| Aug. 11, 1989 | [JP] | Japan | 1-209067 |
| Aug. 11, 1989 | [JP] | Japan | 1-209068 |
| Nov. 30, 1989 | [JP] | Japan | 1-311422 |
| Apr. 16, 1991 | [JP] | Japan | 3-111158 |
| Sep. 16, 1991 | [JP] | Japan | 3-262764 |

[51] Int. Cl.$^5$ .................. G06K 7/10; G06K 19/00
[52] U.S. Cl. .................. 235/454; 235/457; 250/566
[58] Field of Search ............ 250/566; 235/454, 457, 235/487, 488; 356/71

[56] References Cited

U.S. PATENT DOCUMENTS

| 3,821,518 | 6/1974 | Miller | 235/457 |
| 4,034,211 | 7/1977 | Horst et al. | 235/61.12 N |
| 4,129,382 | 12/1978 | Greenaway | 356/71 |
| 4,143,810 | 3/1979 | Greenaway | 235/457 |
| 4,150,781 | 4/1979 | Silverman et al. | 235/457 |
| 4,163,570 | 8/1979 | Greenaway | 283/8 A |
| 4,211,918 | 7/1980 | Nyfeler et al. | 235/487 |
| 4,501,439 | 2/1985 | Antes | 283/91 |
| 4,537,504 | 8/1985 | Baltes et al. | 356/71 |
| 4,544,266 | 10/1985 | Antes | 356/71 |
| 5,101,184 | 3/1992 | Antes | 235/457 |

*Primary Examiner*—Edward P. Westin
*Assistant Examiner*—S. B. Allen
*Attorney, Agent, or Firm*—Baker & Daniels

[57] ABSTRACT

To prevent unauthorized duplication of an information storage cards such as magnetic cards, IC cards, and optical cards, the card carries an identification region which may be identified by a simple optical sensor. The identification region may consist of holograph, diffraction grating, a multiplicity of parallel grooves and other processed surfaces having certain reflective or transmissive directivities. In particular, the identification region comprises a plurality of segments having two or more different reflective or transmissive directivities, and these segments are uniformly distributed in the identification region so that all of the segments may be accessed simultaneously by the optical sensor which comprises a light emitter and a light receiver including a plurality of parts each capable of individually detecting light reflected by or transmitted through the identification region.

12 Claims, 7 Drawing Sheets

AUTHENTICITY IDENTIFYING SYSTEM FOR INFORMATION STORAGE CARDS

TECHNICAL FIELD

The present invention relates to a system for determining or identifying authenticity of information storage cards by means of a reader/writer to prevent unauthorized fabrication and alteration of such cards. The information storage cards include, not exclusively, magnetic cards, IC cards, optical cards and so on which are capable of exchanging information with reader/writers. The present invention also relates to such cards provided with an identification region which cannot be easily duplicated but can be easily identified without requiring any undue complication of the card reader/writers.

BACKGROUND OF THE INVENTION

Conventionally, to the end of preventing the forgery of, for instance, a magnetic card, it has been practiced to use a laminated structure for its magnetic layer, and to punch holes in the magnetic card when the magnetic card is not intended for repeated use. However, such structures can be duplicated with deceitful intention by the forgers with relative ease, and may not be sufficient to discourage attempts to illegally duplicate and alter the card. The internal structure of the card may be made more complex by known means, but it will lead to the complication and cost increase of the reader/writers for reading and writing information into and out of the card.

BRIEF SUMMARY OF THE INVENTION

In view of such problems of the prior art, a primary object of the present invention is to provide a system for determining authenticity of an information storage card by certain identification means which is hard to duplicate for any unauthorized person but can be easily Identified with a card reader/writer without increasing its complexity.

A second object the present invention is to provide an information storage card which is Suitable for use in such a system.

These and other objects of the present invention can be accomplished by providing a system for determining authenticity of an information storage card in which: the card comprises an information storage region for storing information in coded form so as to be accessed by a card reader/writer, and an identification region having a unique optical property is thereon; and the card reader/writer comprises means for accessing the coded information, light emitting mean for projecting incident light upon tie identification region carried by the card, light receiving means for detecting light reflected by or transmitted through the identification region, and identification circuit for evaluating the light received by the light receiving means and producing a signal for indicating authenticity of the card, wherein: the identification region comprises a plurality of groups of segments, each group having a different reflective or transmissive directivity, the segments in each group being distributed substantially uniformly over an entire area of the identification region; and the light receiving means is provided with a plurality of parts each capable of individually detecting light reflected by or transmitted through the identification region, the identification circuit determining authenticity of the card according to a combination of the parts which detected light from the identification region. Alternatively, the identification region may comprise a plurality of segments which are arranged substantially closely to one another within the identification region so that all of the segments may be accessed simultaneously by the incident light projected from the light emitting means.

Thus, the forgery of such cards is made significantly more difficult than was heretofore since the identification region consists of a plurality of segments having different reflective or transmissive optical properties, such as small areas of holograph, or diffraction grating, or small areas provided with a multiplicity of parallel grooves, which may be made difficult to analyze or duplicate to a desired extent. However, identification of the authenticity of the card can be carried out without increasing the complexity of the process of identifying the card since it can be accomplished simply by providing one or more photosensitive light receiving means.

The actual process of determining or identifying the authenticity of the card can be accomplished by detecting the intensity of light received by the light receiving means which includes a plurality of light receiving parts arranged around the light emitting means along a concentric circle concentric to the light emitting means.

The present invention also provides information storage cards comprising: a card main body; an information storage region provided in the card main body for storing information in coded form so as to be accessed by a card reader/writer; and an identification region provided on an optically accessible part of the card main body and having a plurality of groups of segments, each group having a different reflective or transmissive directivity, the segments in each group being distributed substantially uniformly over an entire area of the identification region. Alternatively, the segments may consist of those having different reflective or transmissive directivities and being arranged substantially closely to one another within the identification region so that all of the segments may be accessed simultaneously by the incident light projected from the light emitting means.

BRIEF DESCRIPTION OF THE DRAWINGS

Now the present invention is described in the following with reference to the appended drawings, in which.

Figure 1:
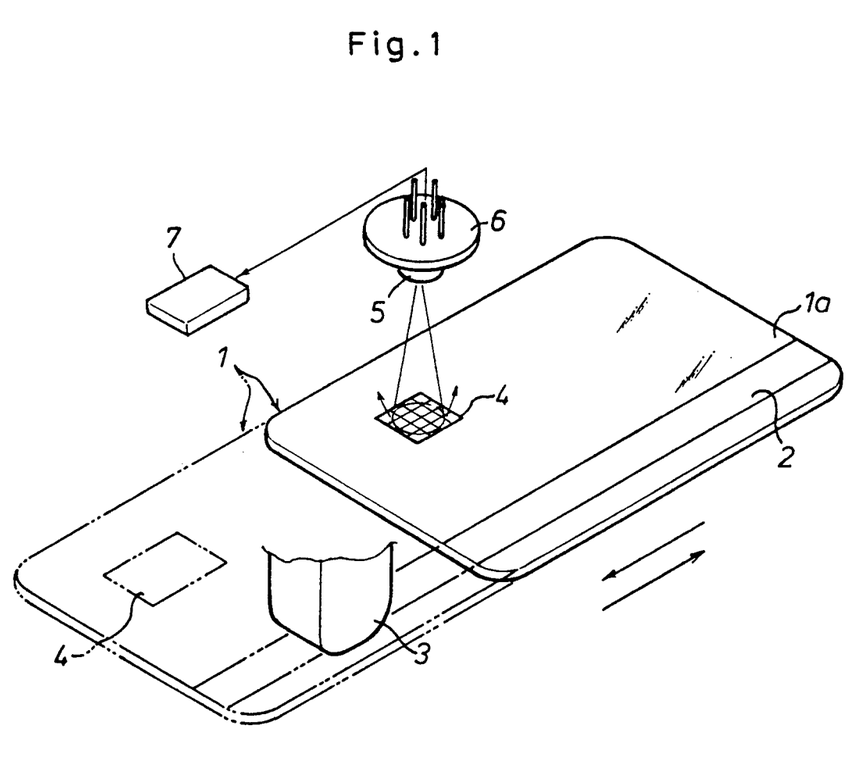
FIG. 1 is a perspective view of a card and an essential part of a card reader/writer according to a first embodiment of the card authenticity determining system according to the present invention.

FIG. 1 shows a first embodiment of the authenticity identifying system according to the present invention which comprises a magnetic card 1 and a card reader/writer 8. The card 1 is conveyed within the card reader/writer 8 in the direction indicated by the arrows by conveyor rollers not shown in the drawings. A magnetic head 3 included in the card reader/writer 8 writes into and read out of a magnetic stripe 2 provided on a major surface 1a of the magnetic card 1.

An identification region 4 consisting of diffraction grating is provided on the major surface 1a of the card 1 next to the magnetic stripe 2. This identification region 4 is provided with a property to reflect incident light of a given wave length projected perpendicularly onto the identification region 4 to a prescribed direction as diffraction light.

Figure 2:
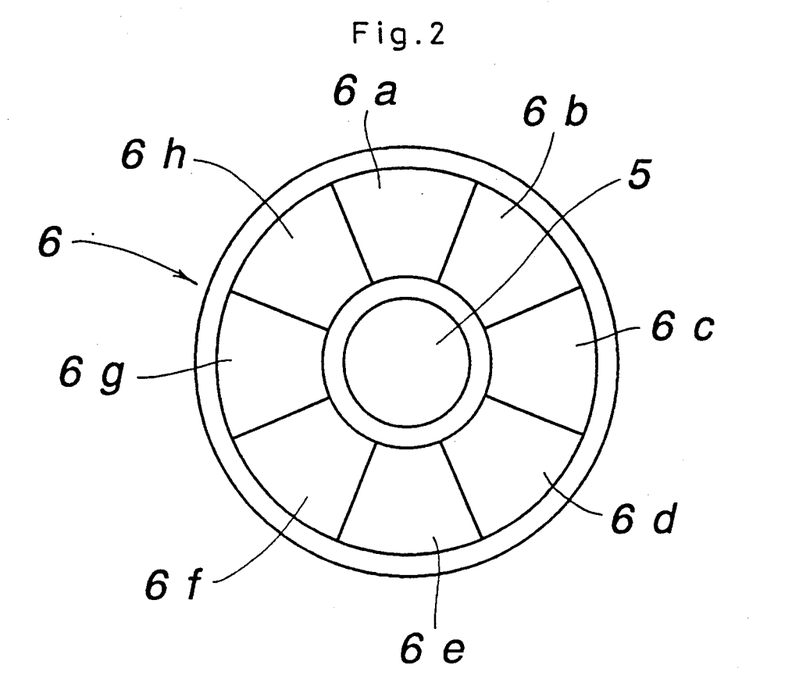
FIG. 2 is an enlarged bottom view of the light emitting/receiving device of FIG. 1.

The card redder/writer 8 further comprises a light emitting device 5 consisting of a laser diode which directly faces the identification region 4 when the card 1 is in the illustrated position within the card reader/writer 8. The light emitting device 5 is surrounded by a plurality of parts 6a through 6d of a light receiving device 6 consisting of a multi-element photodiode which is divided into the parts 6a through 6d by radial lines. The output of each of the parts 6a through 6d is connected to an identification unit 7 which determines the authenticity of the card 1 according to the inputs from the photodiode parts 6a through 6d.

Figure 3:
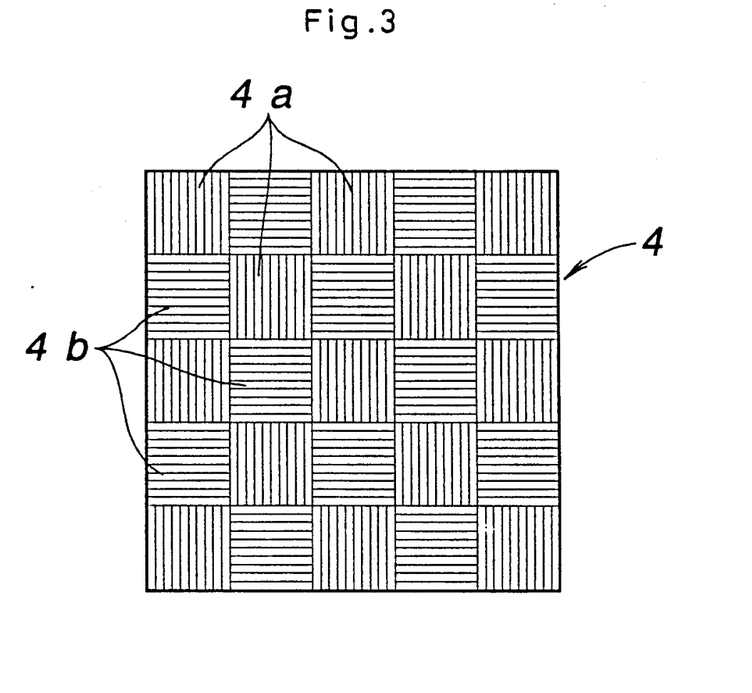
FIG. 3 is an enlarged plan view of the identification region of the first embodiment.

Referring to FIG. 3, the identification region 4 includes a plurality of rectangular segments. The segments 4a each consist of a diffraction grating having parallel grooves extending vertically as seen in FIG. 3 while the segments 4b each consist of a diffraction grating having parallel grooves extending laterally as seen in FIG. 3. These two kinds of segments are arranged in an alternating fashion or in a checkered patters. Therefore, when an illuminating light is projected upon the identification region 4, the light reflected from the segments 4a is directed to the parts 6a and 6e while the light reflected from the segments 4b are directed to the parts 6c and 6g.

In carrying out the process of identification, the card 1 is conveyed into the card reader/writer 8, and an illuminating light from the light emitting device is projected upon the identification region 4. The light reflected from the identification region 4 is received by the light receiving device 6. The outputs from the different parts of the light receiving device 6 are supplied to the identification unit 7 which determines the authenticity of the card 1.

Figure 4:
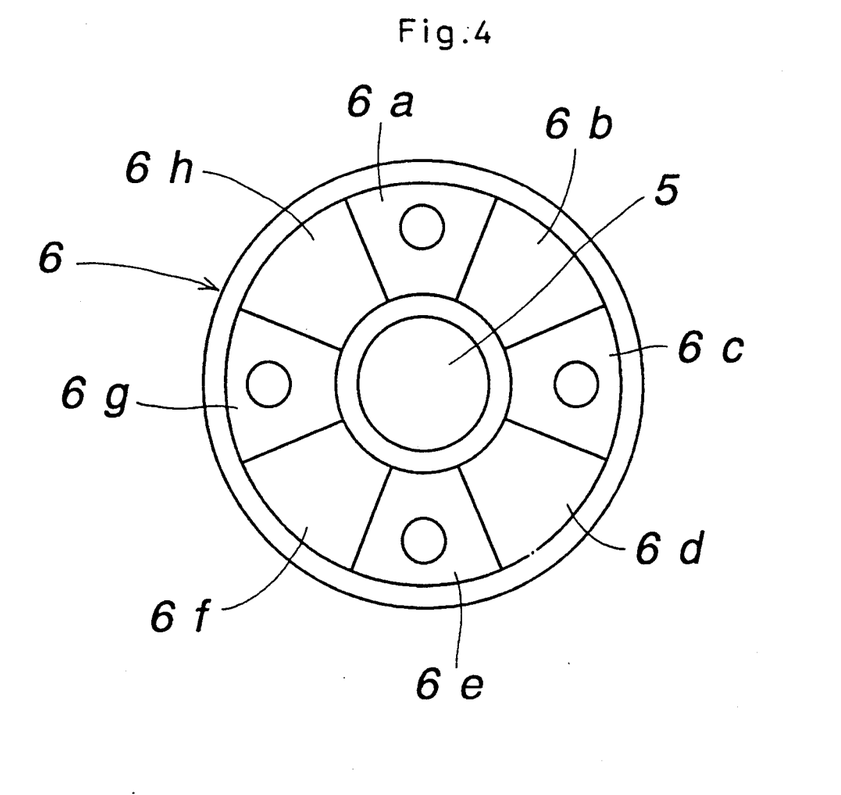
FIG. 4 is a view similar to FIG. 2 showing a typical pattern of the light received by the different parts of the light receiving device.
Figure 5:
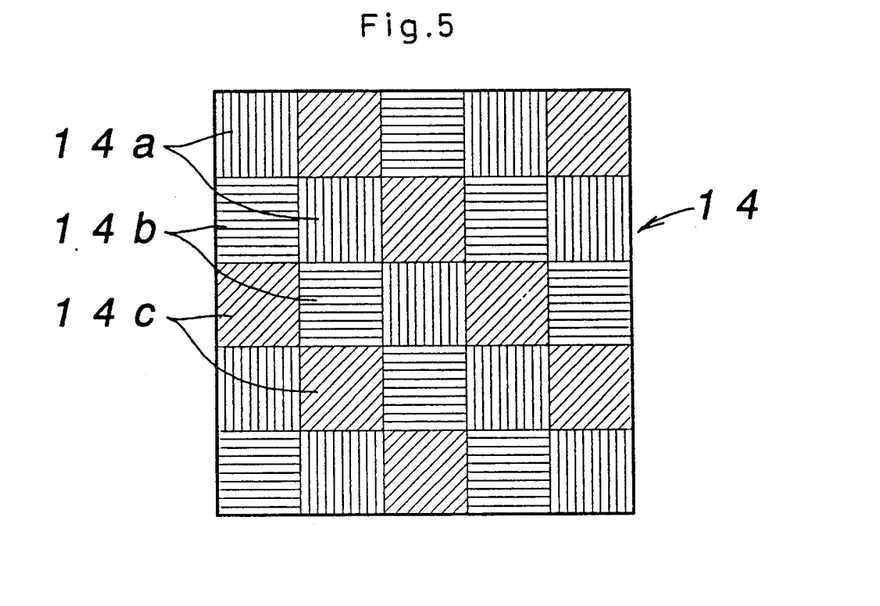
FIGS. 5 and 6 are views similar to FIGS. 3 and showing a second embodiment of the present invention.
Figure 6:
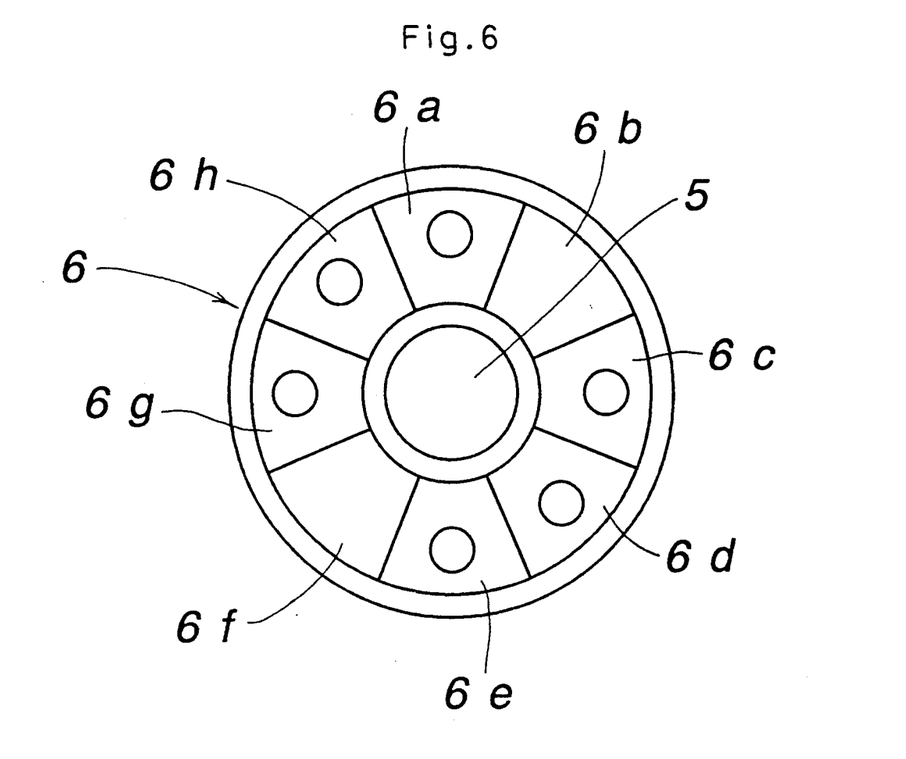

FIGS. 5 and 6 are views similar to FIGS. 3 and 4, respectively, and show a second embodiment of the present invention. The identification region 14 comprises segments 14c having obliquely extending parallel grooves as well as segments 14a having vertically extending parallel grooves and segments 14b having horizontally extending parallel grooves.

Therefore, the light reflected by the segments 14a is received by the parts 6a and 6e, the light reflected by the segments 14b are received by the parts 6c and 6g, and the light reflected by the segments 14c is received by the parts 6d and 6h. Otherwise, the second embodiment is similar to the first embodiment.

Figure 7:
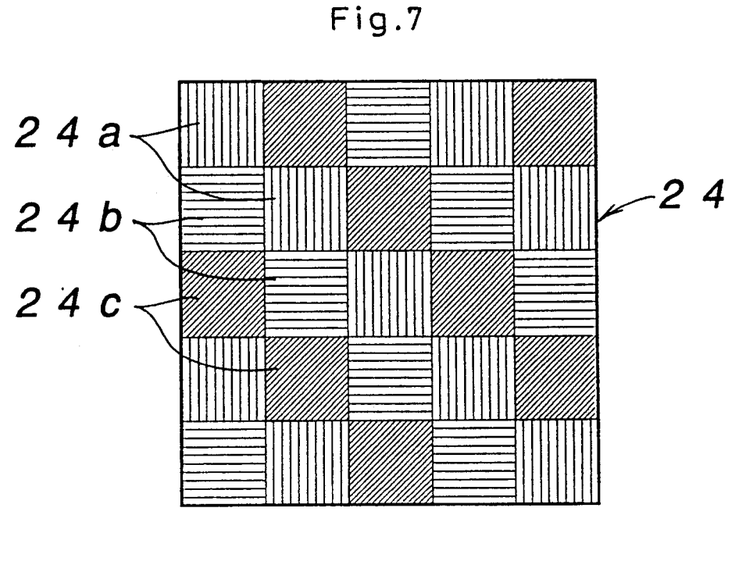
FIGS. 7 and 8 are views similar to FIGS. 3 and showing a third embodiment of the present invention.
Figure 8:
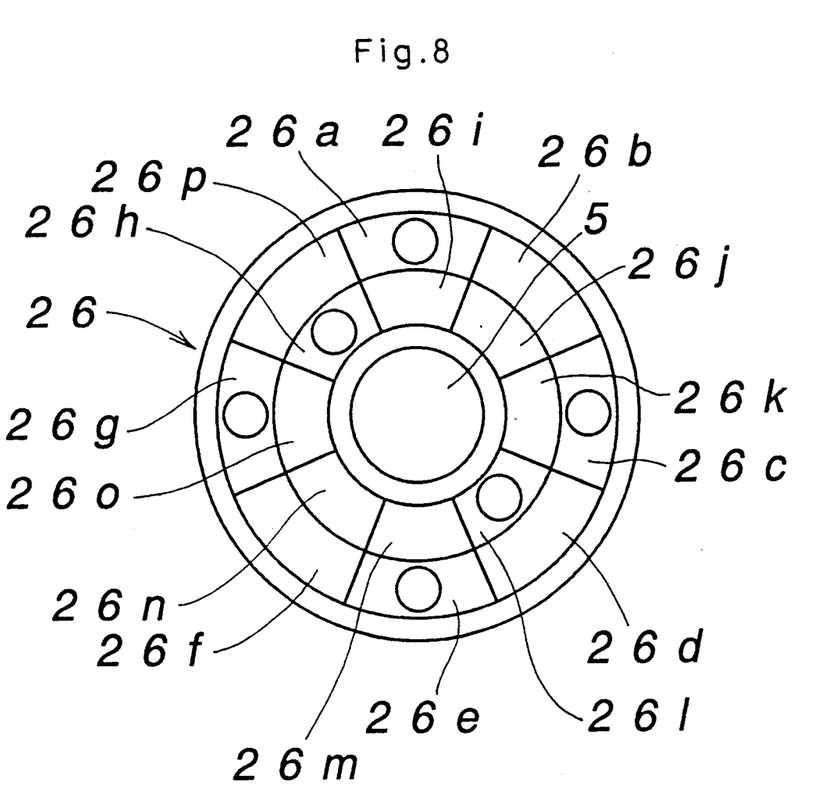

FIGS. 7 and 8 are views similar to FIGS. 3 and 4, respectively, and show a third embodiment of the present invention. The identification region 24 comprises segments 24c having obliquely extending parallel grooves as well as segments 24a having vertically extending parallel grooves and segments 24b having horizontally extending parallel grooves. Further, the oblique grooves of the segments 24c are finer in pitch that the vertical and lateral grooves of the segments 24a and 24b. In this embodiment, the light receiving device 26 comprises a plurality of parts surrounding a light emitting device 5, and the parts of the light receiving device 26 are defined by a plurality of radial lines and a circle concentric to the light emitting device 5. In other words, the parts 25a through 26h of the light receiving device are arranged around the light emitting device 5 in two concentric circles.

When an illuminating light is projected upon the identification region 24, the light reflected by the segments 24a is received by the parts 26a and 26e, and the light reflected by the segments 24b are received by the parts 26c and 26g. The light reflected by the segments 24c is received by the parts 26l and 26p because the segments 24c have grooves of a finer pitch and the reflected light of the first order is directed closer to the optical axis of the incident light. According to this embodiment, by varying the pitch of some of the segments in addition to the direction of parallel grooves, the reflective property of the identification region is even more diversified. Otherwise, the present embodiment is similar to the previous embodiments.

Figure 9:
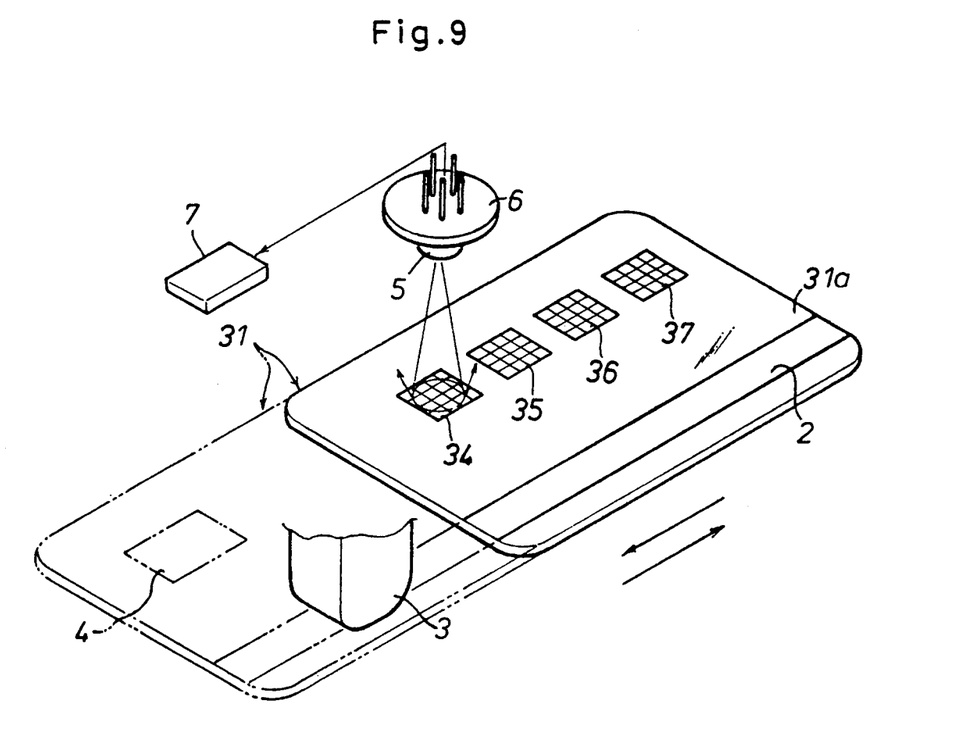
FIG. 9 is a perspective view Similar to FIG. 1 showing a fourth embodiment of the present invention.

FIG. 9 is a view similar to FIG. 1 and shows a fourth embodiment of the present invention. In this embodiment, four identification regions 34 through 37 are provided on a major surface 31a of a magnetic card 31 in a single row along the direction in which the card 1 is conveyed. As the card 1 is conveyed, a light emitting device 5 projects an illuminating light upon each of the identification regions 34 through 37 in turn, and the light reflected by these identification regions 34 through 37 is received by a light receiving device 6 consisting of eight sector-shaped parts 6a through 6h surrounding the light emitting device 5. The outputs from these parts 6a through 6h are supplied to an identification unit 7 which determines the authenticity of the card 1 according to these signals. In this case, it is necessary that each and every one of the identification regions 34 through 37 is required to have a prescribed reflective directivity, and the overall reflective directivity pattern is even more diversified than the previous embodiments, and authorized duplication of the card is made even more difficult.

Figure 10:
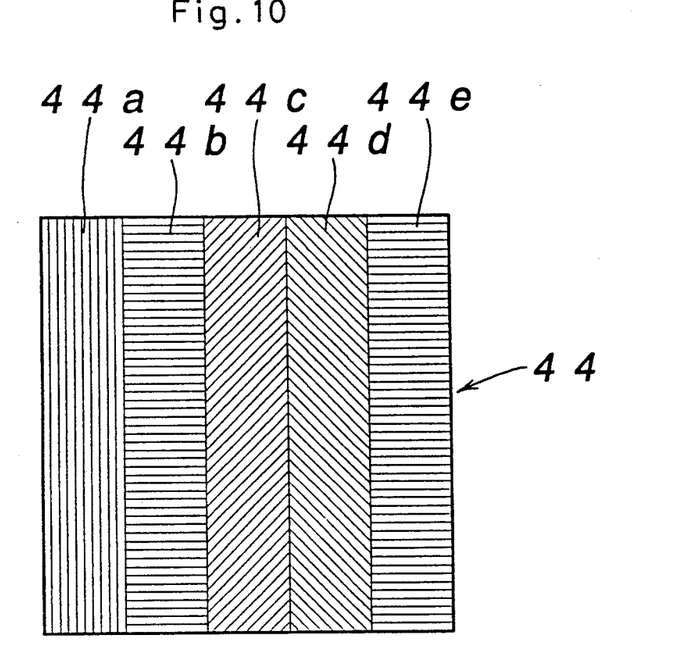
FIGS. 10 and 11 are views similar to FIG. 3 showing fifth and sixth embodiments of the present invention.

FIG. 10 is a view similar to FIG. 3 and shows a fifth embodiment of the present invention. In this case, the identification region 55 is divided into five stripes 44a through 44e. In this case, the segment 44a consists of vertical parallel lines, the segments 44b and 44e consist of lateral parallel lines, the segment 44c consist of oblique parallel lines, and the segment 44d consist of oblique parallel lines which are oblique in a direction different from that of the segment 44c.

The illuminating light from the light emitting device 5 may be projected simultaneously on all of the stripes 44a through 44e. Alternatively, the illuminating light may be projected on one of the stripes at a time in a sequential manner or, in other words, may be scanned from one stripe to another. In this case also, according to the outputs from the various parts of the light receiving device 6, with or without considering the time sequence of the outputs, the authenticity of the card 1 is determined by the identification unit 7.

Figure 11:
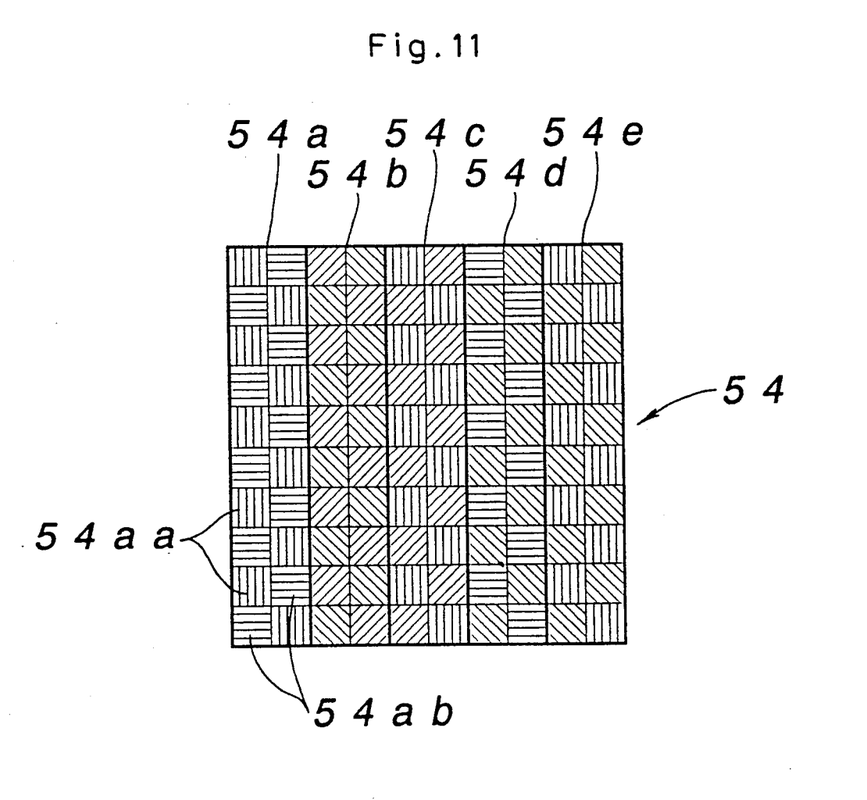

FIG. 11 shows a sixth embodiment of the present invention in which the identification region 54 is divided into five stripes 54a through 54e and each of the stripes consists of a checkered pattern of two kinds of rectangular segments of diffraction grating. This shows yet another way to evenly distribute small segments of diffraction grating within the identification region. This embodiment is particularly advantageous in discouraging unauthorized duplication when the illuminating light scans each of the stripes in a sequential manner.

In the above embodiments, the identification regions consisted of a combination of small segments of diffraction grating. However, it is equally possible to use holograph of parallel grooves having a pitch (for instance, one to 100 grooves per mm) which may not be fine enough to achieve diffraction of light. Further, the shape of each segment of the identification region is not limited to be a rectangle but each segment may also have triangular, circular, polygonal or other convenient shapes.

Figure 12:
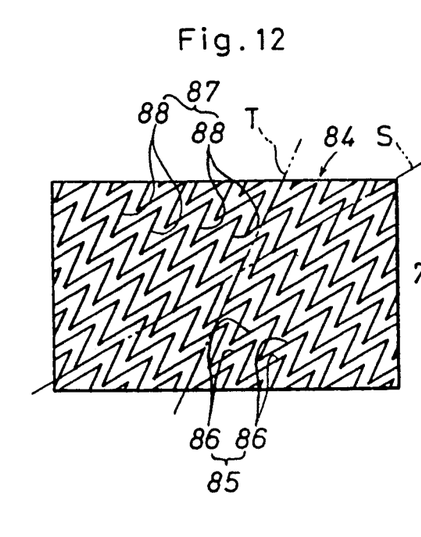
FIGS. 12 and 13 are views similar to FIGS. 3 and 4 showing a seventh embodiment of the present invention.
Figure 13:
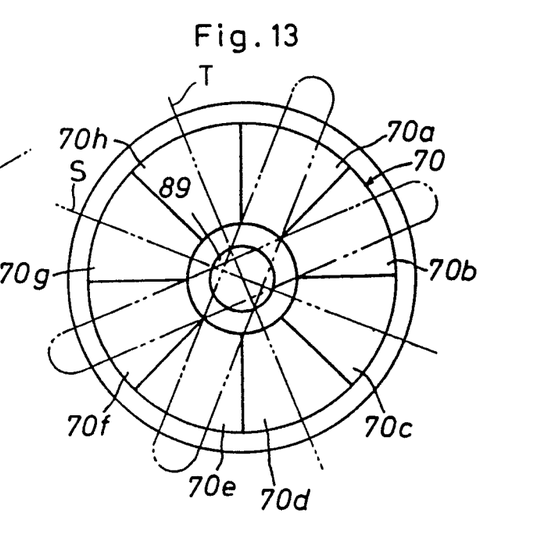

FIGS. 12 and 13 show a sixth embodiment of the present invention. In this embodiment, the identification region 84 consists of a combination of a first group 85 of parallel V-grooves 86 extending in the direction of the imaginary line S and a second group 87 of parallel V-grooves 88 extending in the direction of the imaginary line T which is different from the aforementioned direction. Accordingly, the authenticity of the card 61 can be identified when the light reflected by the identification region 64 impinges upon the light receiving parts 70a through 70h of the light receiving device 70 as a pair of elliptic patterns extending perpendicularly to the directions (imaginary lines S and T) of the grooves 86 and 88 as illustrated in FIG. 13, and this is detected by comparing the positional relationships of those light receiving surfaces (the light receiving parts 70a, 70e, 70b and 70f) receiving light of high intensity. This embodiment is otherwise similar to the previous embodiments.

Obviously, the present invention is not limited by the above embodiments but there are other possible variations. For instance, although the illuminating light was projected from the light emitting device upon the identification region with a lens interposed therebetween in the above described embodiments, mirrors and prisms may be placed in the light path to change the direction of the light path. A photodiode was used as the light receiving device in the above embodiments, but a position sensing device (PSD) may also be used. A position sensing device consists of a semiconductor device comprising a high resistivity, Si inlayer, a player formed on one side thereof or on its light receiving surface, and a n-layer formed on the other side of the inlayer, and a current proportional to the position of a light spot projected on the light receiving surface is produce from electrodes provided on the light receiving surface. Further, although a reflection type identification region was formed on the major surface of the card in the foregoing embodiments, it is also possible to place a similar region on both the surfaces of the card, or to form a transmission type identification region by providing a transparent part in a part of the card.

Although the present invention has been described in terms of specific embodiments, it is possible to modify and alter details thereof without departing from the spirit of the present invention.

What we claim is:

1. A system for determining authenticity of an information storage card in which:
   said card comprises an information storage region for storing information in coded form so as to be accessed by a card reader/writer, and an identification region having a unique optical property thereon; and
   said card reader/writer comprises means for accessing said coded information, light emitting mean for projecting incident light upon said identification region carried by said card, light receiving means for detecting light reflected by or transmitted through said identification region, and identification circuit for evaluating said light received by said light receiving means and producing a signal for indicating authenticity of said card, wherein:
   said identification region comprises a plurality of groups of segments, each group having a different reflective or transmissive directivity, said segments in each group being distributed substantially uniformly over an entire area of said identification region; and
   said light receiving means is provided with a plurality of parts each capable of individually detecting light reflected by or transmitted through said identification region, said identification circuit determining authenticity of said card according to a combination of said parts which detected light from said identification region.

2. A system according to claim 1, wherein each segment of said identification region consists of an area of holograph.

3. A system according to claim 1, wherein each segment of said identification region consists of a n area of diffraction grating.

4. A system according to claim 1, wherein each segment of said identification region consists of a surface provided with a plurality of parallel grooves having a selective reflective directivity.

5. A system according to claim 1, wherein said light receiving parts are arranged around said light emitting means along a common circle centered around said light emitting means.

6. A system according to claim 5, wherein said light receiving parts are arranged around said light emitting means along at least two concentric circles concentric to said light emitting means.

7. A system according to claim 1, wherein each of said segments is substantially square in shape, and said segments are arranged in a checkered pattern in said identification region.

8. A system according to claim 1, wherein each of said segments is an elongated rectangle in shape, and said segments are arranged in a striped pattern in said identification region.

9. A system according to claim 1, wherein said segments are defined by different parts of a zigzag linear pattern each containing a multiplicity of parallel lines.

10. A system for determining authenticity of an information storage card in which:
    said card comprises an Information storage region for storing information in coded form so as to be accessed by a card reader/writer, and an identification region having a unique optical property thereon; and
    said card reader/writer comprises means for accessing said coded information, light emitting mean for projecting incident light upon said identification region carried by said card, light receiving means for detecting light reflected by or transmitted through said identification region, and identification circuit for evaluating said light received by said light receiving means and producing a signal for indicating authenticity of said card, wherein:

said identification region comprises a plurality of segments which are arranged substantially closely to one another within said identification region so that all of said segments may be accessed simultaneously by said incident light projected from said light emitting means; and said light receiving means is provided with a plurality of parts each capable of individually detecting light reflected by or transmitted through said identification region, said identification circuit determining authenticity of said card according to a combination of said parts which detected light from said identification region.

11. An information storage card, comprising:

a card main body;

an information storage region provided in said card main body for storing information in coded form so as to be accessed by a card reader/writer; and an identification region provided on an optically accessible part of said card main body and having a plurality of groups of segments, each group having a different reflective or transmissive directivity, said segments in each group being distributed substantially uniformly over an entire area of said identification region.

12. An information storage card, comprising:

a card main body;

an information storage region provided in said card main body for storing information in coded form so as to be accessed by a card reader/writer; and an identification region provided on an optically accessible part of said card main body and having a plurality of segments, said segments including those having different reflective or transmissive directivities and being arranged substantially closely to one another within said identification region so that all of said segments may be accessed simultaneously by said incident light projected from said light emitting means.

* * * * *